United States Patent
Corson et al.

(10) Patent No.: US 9,267,439 B2
(45) Date of Patent: Feb. 23, 2016

(54) HIGH ALTITUDE START OF A GAS TURBINE ENGINE USING FUEL PULSING AND STARTER TOGGLING

(75) Inventors: Michael Corson, San Diego, CA (US); Kenneth W. Winston, San Diego, CA (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 867 days.

(21) Appl. No.: 13/418,983

(22) Filed: Mar. 13, 2012

(65) Prior Publication Data
US 2013/0239580 A1    Sep. 19, 2013

(51) Int. Cl.
| | | |
|---|---|---|
| F02C 7/26 | (2006.01) |
| F02C 9/26 | (2006.01) |
| F02C 7/32 | (2006.01) |
| F02C 7/268 | (2006.01) |
| F02C 7/262 | (2006.01) |
| F02C 9/28 | (2006.01) |

(52) U.S. Cl.
CPC ... *F02C 7/26* (2013.01); *F02C 7/32* (2013.01); *F02C 9/26* (2013.01); *F02C 7/262* (2013.01); *F02C 7/268* (2013.01); *F02C 9/28* (2013.01)

(58) Field of Classification Search
CPC ............ F02C 7/26; F02C 7/264; F02C 7/268; F02C 9/26; F02C 9/30; F02C 9/266; F02D 41/06; F05B 2220/50
USPC .................................. 60/778, 790, 788, 786
See application file for complete search history.

(56) References Cited

U.S. PATENT DOCUMENTS

| | | | | |
|---|---|---|---|---|
| 3,418,805 A * | 12/1968 | Barish et al. | ............... | 60/39.281 |
| 4,693,073 A * | 9/1987 | Blackburn | ...................... | 60/778 |
| 5,409,169 A * | 4/1995 | Saikalis et al. | ................ | 239/404 |
| 5,907,949 A * | 6/1999 | Falke et al. | ..................... | 60/779 |
| 6,810,677 B2 * | 11/2004 | Dewis | ............................. | 60/778 |
| 7,204,090 B2 * | 4/2007 | O'Connor | ....................... | 60/778 |
| 7,693,643 B2 * | 4/2010 | Kim et al. | ..................... | 701/100 |
| 7,861,534 B2 * | 1/2011 | Terlecki et al. | ................. | 60/778 |

* cited by examiner

*Primary Examiner* — Phutthiwat Wongwian
*Assistant Examiner* — Alain Chau
(74) *Attorney, Agent, or Firm* — Kinney & Lange, P.A.

(57) ABSTRACT

A system for starting a gas turbine engine includes an engine controller and a fuel controller. The engine controller varies the engine speed between a minimum start speed and a maximum start speed until light-off of the engine occurs. The fuel controller operates a fuel command to vary fuel provided to a combustion chamber of the engine until light-off of the engine occurs.

13 Claims, 5 Drawing Sheets

HIGH ALTITUDE START OF A GAS TURBINE ENGINE USING FUEL PULSING AND STARTER TOGGLING

BACKGROUND

The present invention relates generally to gas turbine engines, and in particular to a system and method for starting an auxiliary power unit (APU) at high altitudes.

Starting a gas turbine requires the engine to be motored to a certain speed such that the fuel-air mixture provided to the combustor is conducive to light-off (i.e., successful ignition of the engine). These conditions become much more difficult to achieve when starting the engine at high altitude. For example, if an aircraft is flying at 40,000 feet, there will be very little air flowing through the engine, and the air that is flowing through the engine will be traveling at fairly high velocities. This makes it very difficult to start an APU, or any gas turbine engine at high altitudes.

Traditionally, starting an APU at high altitude involves spooling the engine up to a constant start speed. When the engine is up to speed, a constant amount of fuel is provided to the combustion chamber for lighting. An igniter in the chamber continuously sparks to attempt to light-off the engine. Due to the unstable air conditions at high altitude, this process is very unpredictable and can cause serious delays in startup of the APU. It is desirable to provide a faster, more reliable method of starting a gas turbine engine at high altitude.

SUMMARY

A starter system for a gas turbine engine includes an engine controller and a fuel controller. The engine controller is configured to vary the speed of the engine between a minimum speed and a maximum speed during lighting of the engine. The fuel controller is configured to vary the delivery of fuel to a combustor of the engine between a minimum fuel value and a maximum fuel value during lighting of the engine.

DETAILED DESCRIPTION

The present invention is a system and method for starting a gas turbine engine at high altitudes. The system includes an engine controller, a fuel controller, fuel nozzles, a starter motor, an exciter, and igniters. The fuel controller varies the fuel provided to a combustion chamber and the engine controller operates the starter motor to vary the speed of the engine. Concurrently varying the fuel and speed of the APU provides a much wider range of air/fuel ratio conditions. By providing a wider window of air/fuel ratio conditions, the likelihood of ignition is greatly increased.

Figure 1:
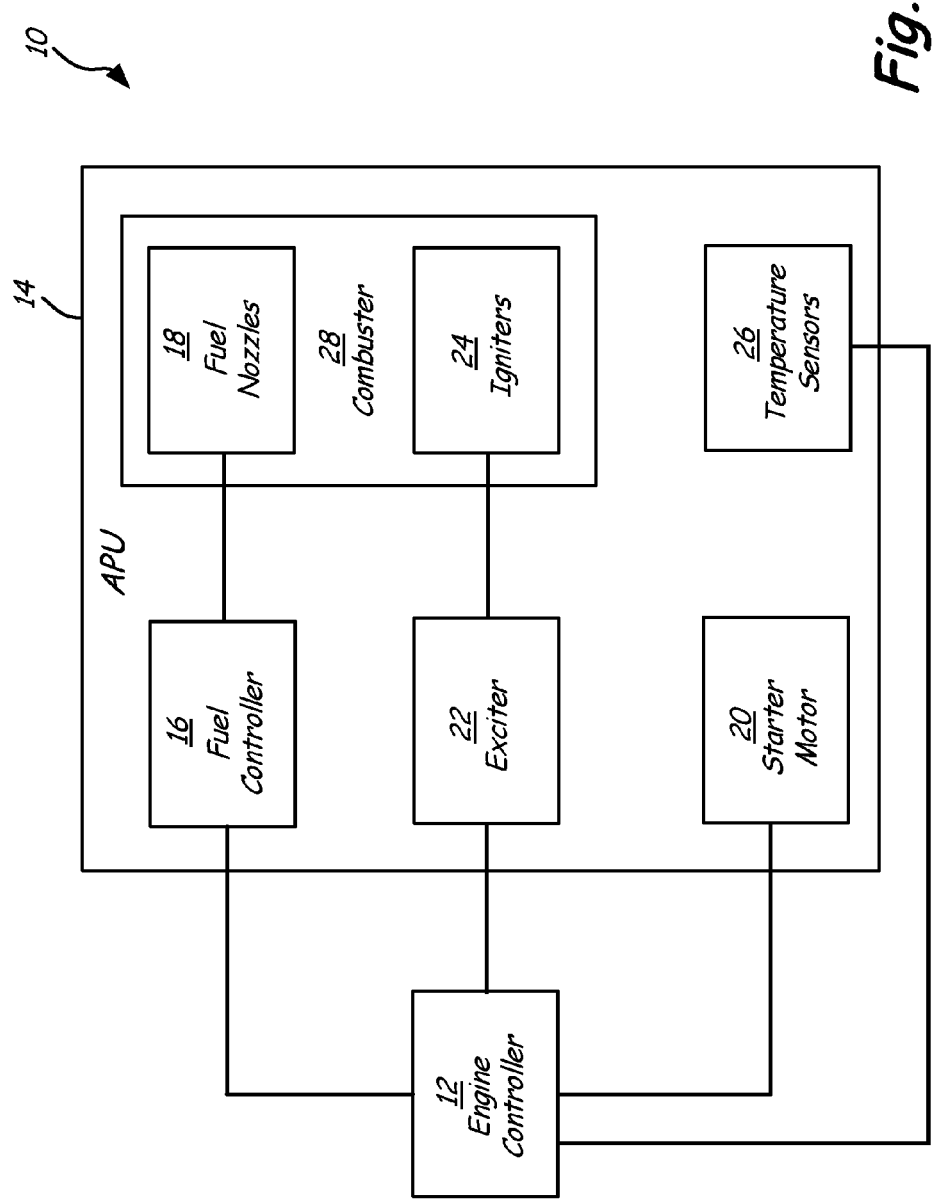
FIG. 1 is a block diagram of a system for starting an APU according to an embodiment of the present invention.

FIG. 1 is a block diagram of a system 10 for starting an APU according to an embodiment of the present invention. System 10 includes engine controller 12, APU 14, fuel controller 16, fuel nozzles 18, starter motor 20, exciter 22, igniters 24, temperature sensors 26, and combustor 28. Engine controller 12 and fuel controller 16 are implemented as microcontrollers capable of executing digital instructions. Although illustrated as separate controllers, fuel controller 16 could be included as a part of engine controller 12. Exciter 22 and igniters 24 are used to provide a spark to the fuel-air mixture in combustion chamber 28 in order to light-off APU 14. Although illustrated as a system for starting an APU, system 10 can be implemented to start any gas turbine engine at high altitude.

Reliable light-off of APU 14 requires a particular air/fuel ratio be provided to combustor 28. This is particularly challenging in applications in which the airflow provided to combustor 28 is unstable, which can be caused as a result of traveling at high altitudes. Successful light-off is dependant upon proper selection of the engine speed and flow of fuel such that a air/fuel mixture is advantageous for successful light-off.

Providing a range of air conditions is accomplished by varying the speed of APU 14. Starter motor 20 is toggled on and off by engine controller 12 in order to accelerate and decelerate the engine. When toggled on, starter motor 20 operates to spool APU 14 up to any speed desired by engine controller 12. When toggled off, APU 14 steadily decelerates over time.

The fuel provided to combustor 28 is also varied in order to provide a wider range of air/fuel ratios. Fuel controller 16 operates a fuel command. The fuel command is a value that indicates how much fuel is being provided to combustor 28 through fuel nozzles 18. By providing quick puffs of fuel, the amount of fuel in combustor 28 starts out a higher value right after the puff, and then dissipates down to a much lower value. By pulsing the fuel at a much faster rate than the speed of APU 14 is being varied, a much wider window of air/fuel ratios is achieved, providing a much greater chance that APU 14 will light-off.

Figure 2A:
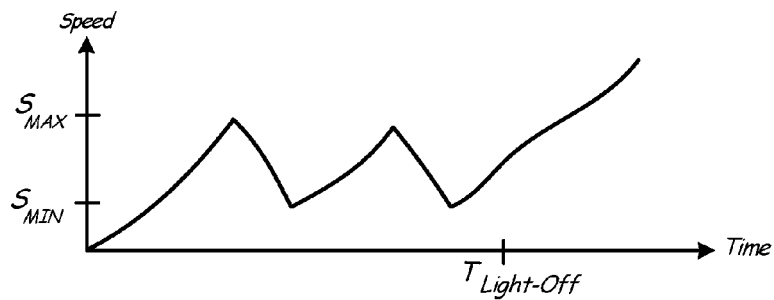
FIGS. 2A-2D are charts illustrating engine speed, fuel input, fuel-air ratio, and engine temperature over time according to an embodiment of the present invention.

FIG. 2A is a chart illustrating an engine speed over time according to an embodiment of the present invention. In order to provide a wide range of air conditions in APU 14 during startup, the engine speed is varied, and more particularly is swung between a minimum value ($S_{MIN}$) and a maximum value ($S_{MAX}$). Engine controller 12 operates starter motor 20 to spool the engine up to the maximum start speed ($S_{MAX}$). When the engine has reached the maximum start speed ($S_{MAX}$), engine controller 12 toggles starter motor 20 off so that the engine may decelerate. The engine speed then decreases over time down to the minimum start speed ($S_{MIN}$). Once the engine speed has reached the minimum start speed ($S_{MIN}$), engine controller 12 repeats the process to once again spool the engine back up to the maximum start speed ($S_{MAX}$). This process is repeated until light-off of APU 14 has occurred. The minimum start speed ($S_{MIN}$) and the maximum start speed ($S_{MAX}$) are any engine speeds that provide a sufficient variance in engine air conditions to facilitate light-off, such as 5% and 15% of maximum engine speed.

Figure 2B:
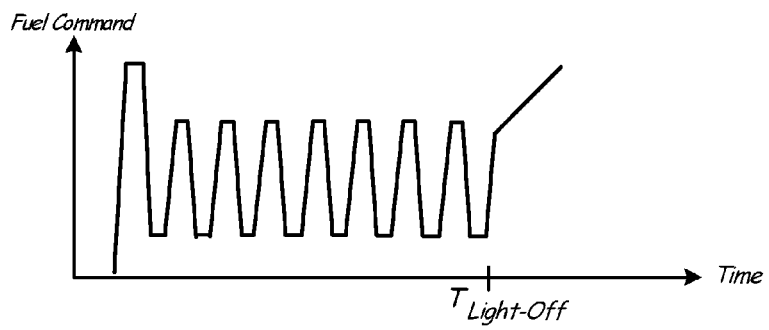

FIG. 2B is a chart illustrating a fuel command over time according to an embodiment of the present invention. The fuel command is a representation of how much fuel is being released into combustor 28 through fuel nozzles 18. The fuel command is implemented and controlled by fuel controller 16. When starting APU 14, a fill routine is first performed. The purpose of the fill routine is to fill all fuel lines and get fuel out into the injectors in preparation for the light routine.

The fill routine is accomplished by operating the fuel command at 100% for a short period of time. Following the fill routine, fuel controller 16 proceeds with the light routine.

During the light routine, fuel controller 16 pulses the fuel command in order to vary the amount of fuel provided to the combustion chamber of APU 14. The fuel command is pulsed at a predetermined frequency such as once every one to two seconds. When pulsed, the fuel nozzles provide a short, high pressure puff of fuel for a first time period. The amount of fuel provided during the puff is controlled by the fuel command. The fuel command may be operated at any value that provides a sufficient high pressure puff, such as 60% of the maximum fuel command. The primary effect of providing a high pressure puff of fuel is high atomization of the fuel in the combustion chamber. High atomization produces smaller droplets of fuel in the combustion chamber. These smaller droplets of fuel are much more conducive to light-off. Following the pulse, the fuel command is dropped to a low value so the fuel dissipates, providing a varied air/fuel ratio, for a predetermined period of time ($T_{PULSE}$). This process is repeated until light-off of APU 14 occurs.

Figure 2C:
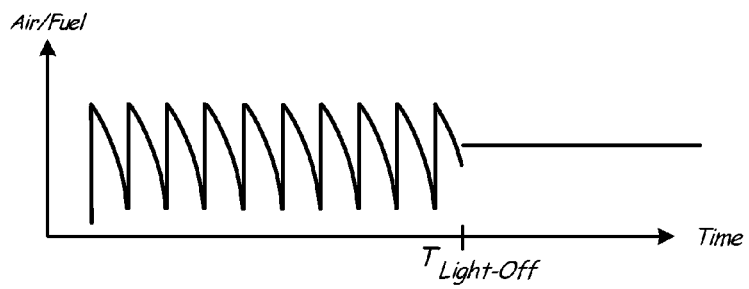

FIG. 2C is a chart illustrating an air/fuel ratio over time according to an embodiment of the present invention. The air/fuel ratio in combustor 28 is dictated by the speed of APU 14, and the fuel provided to combustor 28 through fuel nozzles 18. The ideal air/fuel ratio for combustion to occur is approximately 1.2. Therefore, the speed of APU 14 and the fuel provided to combustor 28 are varied to provide a light-off window of air/fuel ratios centered around that ideal value. This provides a much greater probability of light-off than following the traditional method of providing a single speed and single fuel command for the entirety of starting an APU at high altitude.

Figure 2D:
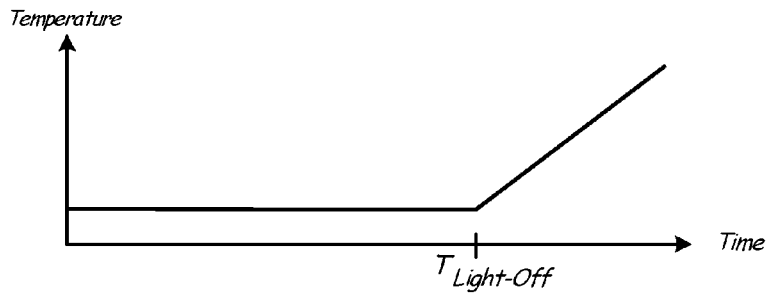

FIG. 2D is a chart illustrating an engine temperature during startup of APU 14 according to an embodiment of the present invention. Successful light-off is detected using temperature sensors 26. Successful light-off results in an increase in the air temperature of the exhaust, which is detected by temperature sensors 26. This increase in air temperature is any increase sufficient to detect light-off, such as 100° F. Engine light-off is illustrated at a time ($T_{LIGHT-OFF}$) but light-off could occur at any moment during the light-off process. Following light-off, engine controller 12 initiates a lit routine to complete startup of APU 14. During the lit routine, engine controller 12 operates to accelerate APU 14 to an operating, self-sustaining speed. Fuel pulsing is terminated and fuel controller 16 operates to provide a much greater, steady flow of fuel from fuel nozzles 18.

Figure 3:
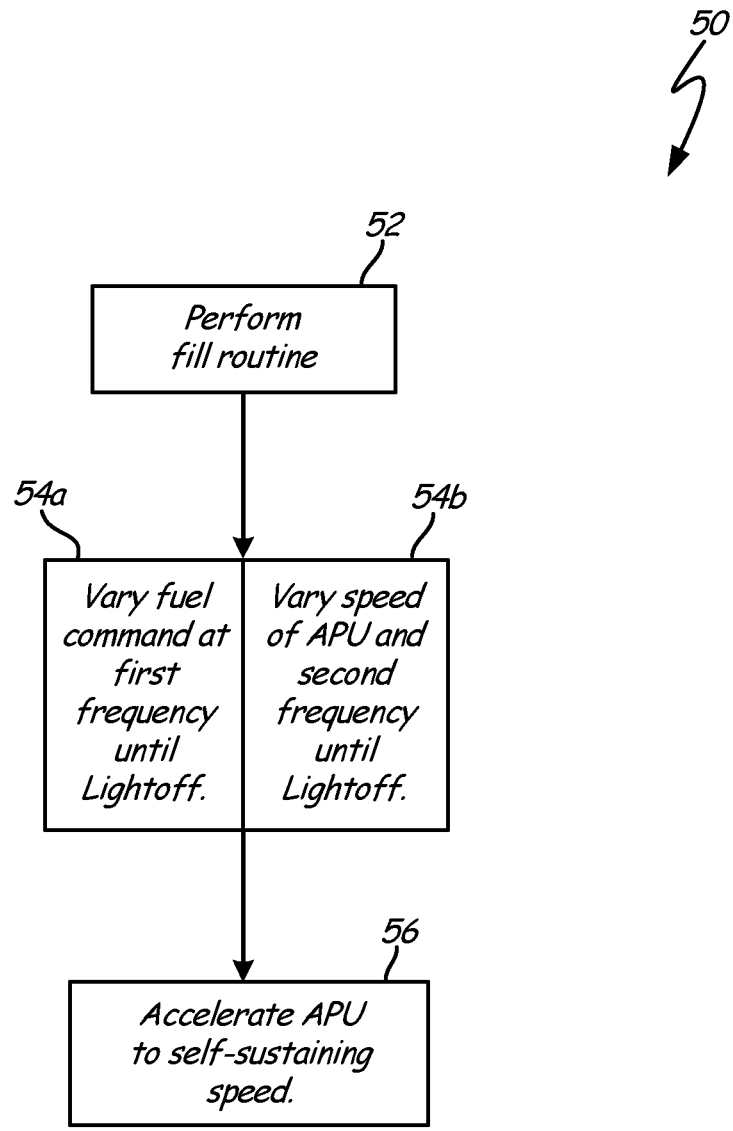
FIG. 3 is a flowchart illustrating a method of starting an APU according to an embodiment of the present invention.

FIG. 3 is a flowchart illustrating a method 50 of starting APU 14 according to an embodiment of the present invention. At step 52, fuel controller 16 operates fuel nozzles 18 to perform a fill routine by executing a maximum fuel command for a short period of time. At step 54, the light routine is started. For step 54a, fuel controller 16 varies the fuel command at a first frequency. For step 54b, concurrently with step 54a, engine controller 12 operates starter motor 20 to vary the speed of APU 14 at a second frequency. Engine controller 12 also operates exciter 22 to operate igniters 24 to provide a continuous spark to attempt to light-off APU 14. Method 50 remains at step 54 until successful light-off of APU 14 has occurred. Once light-off has occurred, method 50 proceeds to step 56 and engine controller 12 operates starter motor 20 to accelerate APU 14 to operational speed, self-sustaining speed.

Figure 4:
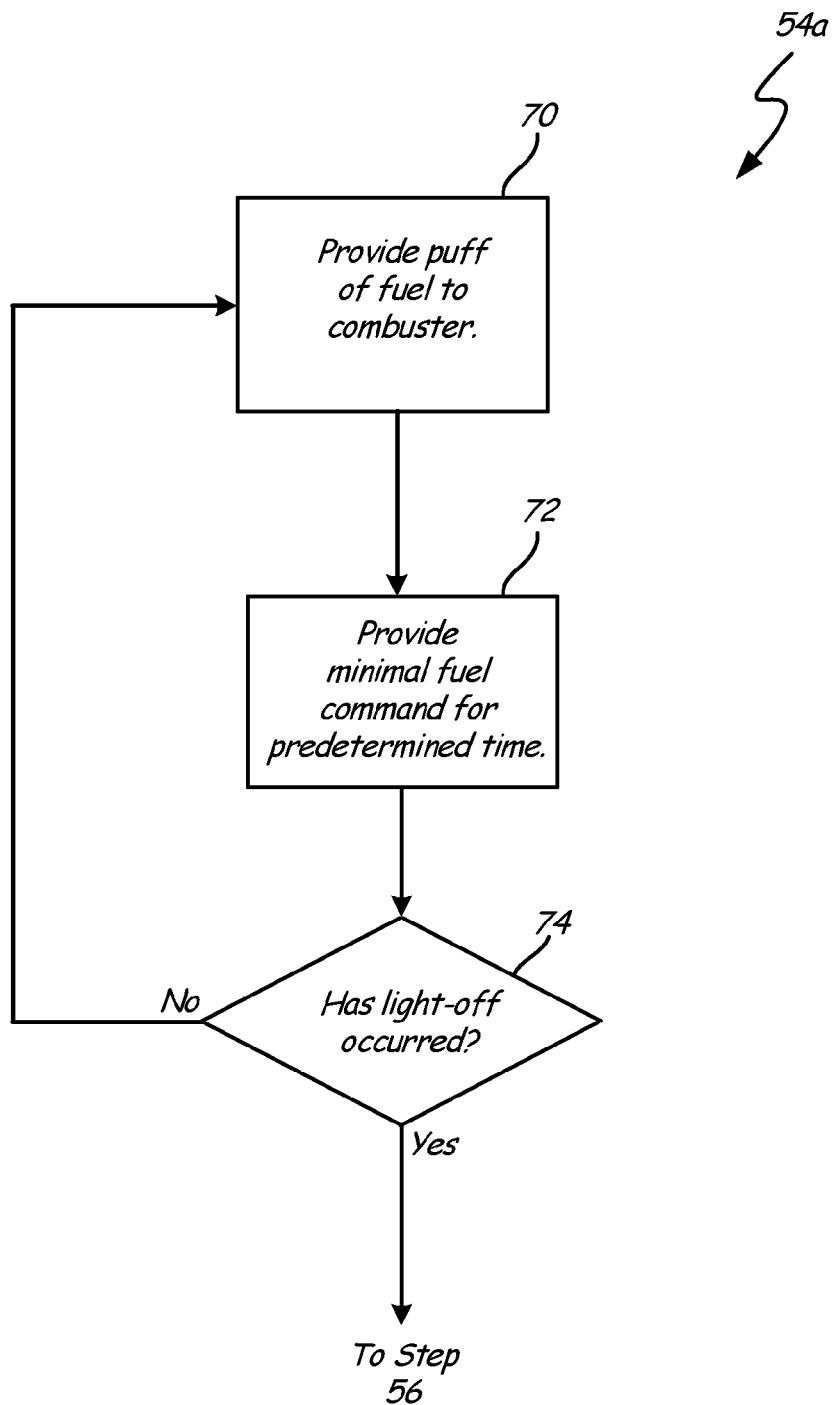
FIG. 4 is a flowchart illustrating a method of varying a fuel command during startup of an APU according to an embodiment of the present invention.

FIG. 4 is a flowchart illustrating in additional detail step 54a illustrated in FIG. 3. At step 70, fuel controller 16 executes a large fuel command for a short period of time in order to provide a puff of fuel to combustor 26. At step 72, fuel controller 16 executes a minimal fuel command for a predetermined period of time in order to allow the puff of fuel in combustor 26 to dissipate, in turn allowing the air/fuel ratio to decrease over time. At step 74, it is determined if engine light-off has occurred by monitoring temperature sensors 26 for a 100° F. rise in exhaust temperature. If engine light-off has occurred, the process proceeds to step 56 illustrated in FIG. 3. If light-off has not occurred, the process proceeds to step 70. While illustrated following step 72, the exhaust temperature is continuously monitored throughout the process to detect light-off.

Figure 5:
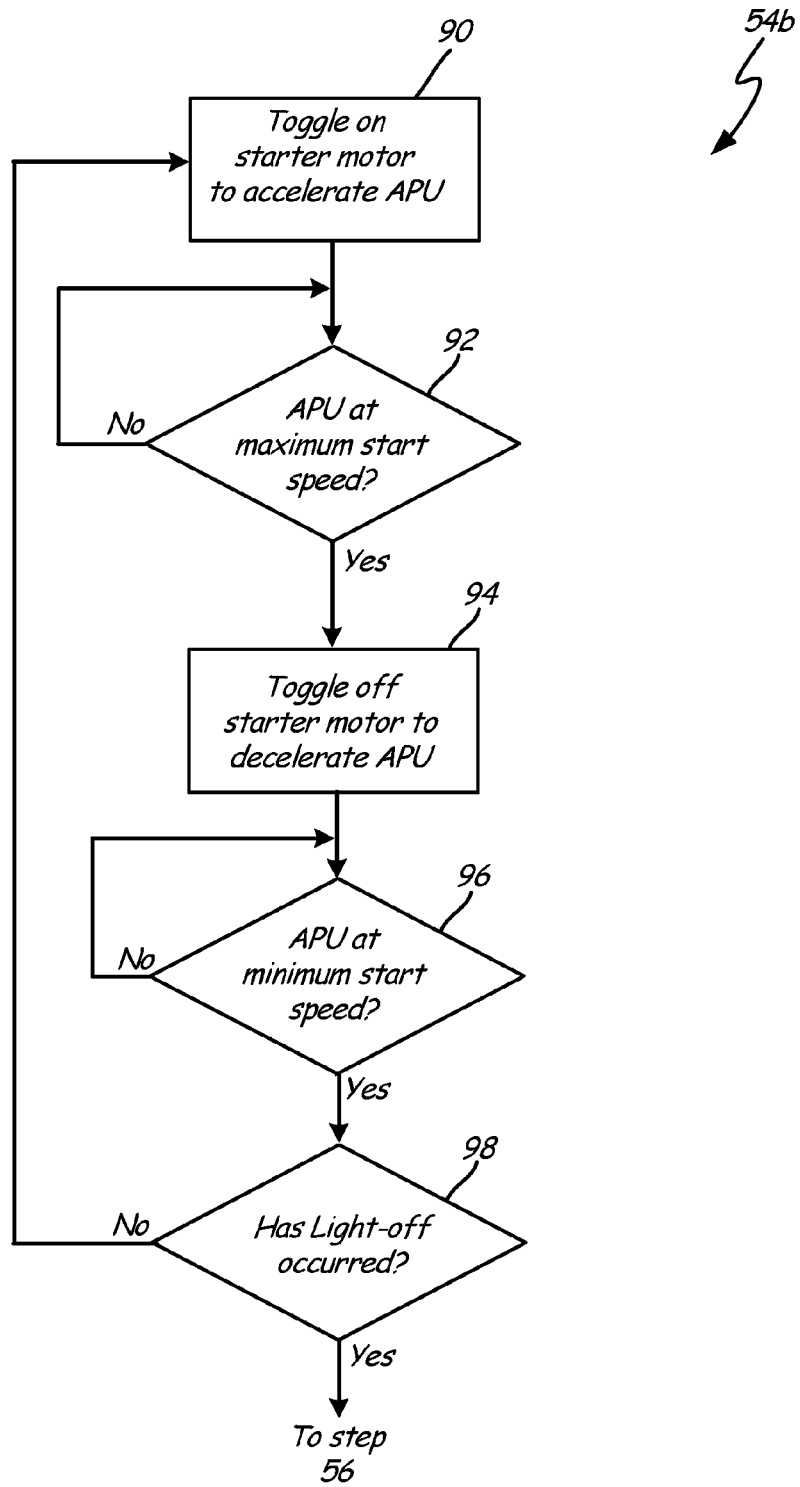
FIG. 5 is a flowchart illustrating a method of varying a speed of an APU during startup according to an embodiment of the present invention.

FIG. 5 is a flowchart illustrating in additional detail step 54b illustrated in FIG. 3. At step 90, starter motor 20 is toggled on and spools up the speed of APU 14. The process then remains at step 92 until it is determined that APU 14 has reached the maximum starting speed ($S_{MAX}$). At step 94, starter motor 20 is toggled off by engine controller 12 and APU 14 decelerates. The process then remains at step 96 until it is determined that APU 14 has reached the minimum starting speed ($S_{MIN}$). At step 98, it is determined if engine light-off has occurred by monitoring temperature sensors 26 for a 100° F. rise in exhaust temperature. If engine light-off has occurred, the process proceeds to step 56 illustrated in FIG. 3. If light-off has not occurred, the process proceeds to step 90. While illustrated following step 96, the exhaust temperature is continuously monitored throughout the process to detect light-off.

In this way, the present invention describes a system and method for starting a gas turbine engine at high altitudes. Although the present invention has been described with reference to preferred embodiments, workers skilled in the art will recognize that changes may be made in form and detail without departing from the spirit and scope of the invention.

The invention claimed is:

1. A system for starting a gas turbine engine, the system comprising:
    an engine controller for controlling speed of the engine, wherein the engine controller is configured to vary the speed of the engine between a minimum speed value and a maximum speed value for at least two cycles during lighting of the engine, and wherein each of the at least two cycles of varying the speed of the engine includes toggling a starter motor on such that the speed of the engine accelerates to the maximum speed value, and toggling the starter motor off such that the speed of the engine decelerates to the minimum speed value, until light-off of the gas turbine engine has occurred;
    a fuel controller for controlling delivery of fuel to a combustor of the engine, wherein the fuel controller is configured to vary the delivery of fuel to the combustor of the engine between a minimum fuel value and a maximum fuel value during the lighting of the engine, and wherein varying the delivery of fuel occurs concurrently with the at least two cycles of varying the speed of the gas turbine engine; and
    temperature sensors for monitoring a temperature of an exhaust of the gas turbine engine to determine when the light-off of the gas turbine engine has occurred;
    wherein the engine controller is further configured to accelerate the engine to a self-sustaining speed upon determining the light-off of the gas turbine engine has occurred.

2. The system of claim 1, further comprising a starter motor for controlling the speed of the engine, wherein the engine controller operates the starter motor to spool the engine between the minimum speed value and the maximum speed value.

3. The system of claim 2, wherein the engine controller is further configured to operate the starter motor to vary the speed of the engine between the minimum speed value and the maximum speed value at a first frequency.

4. The system of claim 3, wherein the fuel controller is further configured to pulse the fuel command at a second frequency.

5. The system of claim 4, wherein the second frequency is greater than the first frequency.

6. The system of claim 1, further comprising one or more igniters for continuously sparking while the engine controller varies the speed of the engine and the fuel controller varies the fuel command of the engine.

7. The system of claim 1, wherein the engine controller is configured to vary the speed of the engine and the fuel controller is configured to vary the delivery of fuel to the combustor of the engine until the temperature sensors detect a predetermined rise in exhaust temperature of the engine indicative of the light-off of the gas turbine engine.

8. A method of starting a gas turbine engine, the method comprising:
　　varying a speed of the gas turbine engine between a minimum speed value and a maximum speed value for at least two cycles, wherein each of the at least two cycles of varying the speed of the gas turbine engine includes toggling a starter motor on such that the speed of the engine accelerates to the maximum speed value, and toggling the starter motor off such that the speed of the engine decelerates to the minimum speed value, until light-off of the gas turbine engine has occurred;
　　varying a fuel command between a minimum fuel value and a maximum fuel value to vary an amount of fuel delivered to a combustor of the engine, wherein varying the fuel command occurs concurrently with the at least two cycles of varying the speed of the gas turbine engine;
　　monitoring a temperature of an exhaust of the gas turbine engine to determine when the light-off of the gas turbine engine has occurred; and
　　accelerating the engine to a self-sustaining speed upon determination of the light-off of the gas turbine engine.

9. The method of claim 8, wherein varying the fuel command between the minimum fuel value and the maximum fuel value comprises pulsing delivery of fuel from fuel nozzles at a first frequency.

10. The method of claim 9, wherein pulsing the fuel command at a first frequency comprises:
　　providing a puff of fuel to a combustion chamber for a first time period at the maximum fuel value; and
　　providing a flow of fuel to the combustion chamber for a second time period at the minimum fuel value.

11. The method of claim 10, wherein providing a flow of fuel at the minimum fuel value comprises providing no fuel to the combustion chamber.

12. The method of claim 8, wherein prior to varying the fuel command between a minimum fuel value and a maximum fuel value, a fill routine is performed.

13. The method of claim 8, wherein monitoring a temperature of an engine exhaust to determine when the gas turbine engine has lit comprises monitoring the engine exhaust for a rise in temperature of 100° F.

\* \* \* \* \*